United States Patent [19]

Eizenhöfer et al.

[11] Patent Number: 4,688,210
[45] Date of Patent: Aug. 18, 1987

[54] METHOD OF AND ARRANGEMENT FOR SYNCHRONIZING THE RECEIVER ARRANGEMENTS IN A DIGITAL MULTIPLEX TRANSMISSION SYSTEM

[75] Inventors: Alfons Eizenhöfer, Altdorf; Christoph Grauel, Feucht, both of Fed. Rep. of Germany

[73] Assignee: U.S. Philips Corporation, New York, N.Y.

[21] Appl. No.: 841,134

[22] Filed: Mar. 18, 1986

[30] Foreign Application Priority Data

Mar. 29, 1985 [DE] Fed. Rep. of Germany ....... 3511430

[51] Int. Cl.$^4$ .......................... H04J 13/00; H04J 4/00; H04J 3/06; H04B 1/00
[52] U.S. Cl. .................................... 370/18; 370/100; 455/54; 375/107
[58] Field of Search .................... 370/12, 18, 100, 50; 375/110, 107, 116, 112; 455/54

[56] References Cited

U.S. PATENT DOCUMENTS

| | | | |
|---|---|---|---|
| 3,394,224 | 7/1968 | Helm | 370/18 |
| 3,727,005 | 4/1973 | Franaszek | 370/18 |
| 4,621,355 | 11/1986 | Hirosaki et al. | 370/18 |

*Primary Examiner*—Douglas W. Olms
*Assistant Examiner*—Frank M. Scutch, III
*Attorney, Agent, or Firm*—Thomas A. Briody; Jack Oisher; William J. Streeter

[57] ABSTRACT

A digital multiplex radio transmission system wherein transmission channels between a fixed radio station and a plurality of mobile radio stations may be established by code division multiplex or frequency division multiplex, individual message channels being separated by means of different distributions of the data symbols transmitted therein. In order to synchronize the fixed station transmitter with the mobile station receivers, respective synchronizing symbols are inserted between the successive data symbols transmitted in any channel. The synchronizing symbols used in all channels are the same, and are spaced at the same time intervals in each channel. Consequently, they are received with significantly higher energy than the data symbols, permitting the multi-path profile to be measured and providing reliable synchronization.

9 Claims, 7 Drawing Figures

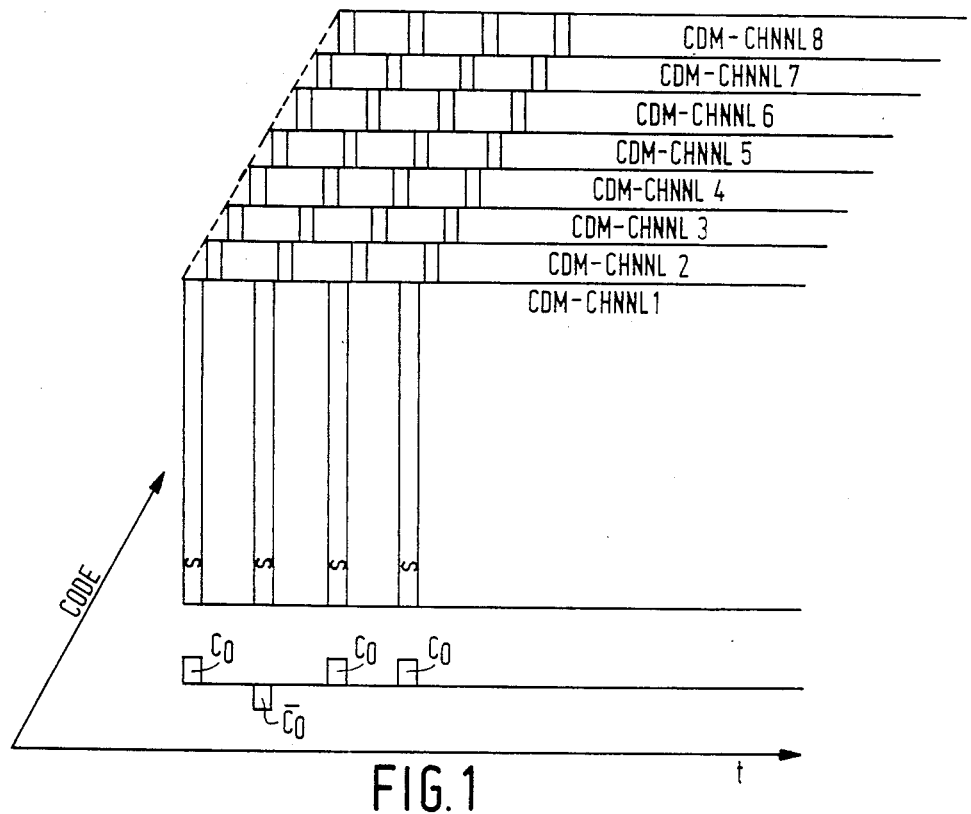

METHOD OF AND ARRANGEMENT FOR SYNCHRONIZING THE RECEIVER ARRANGEMENTS IN A DIGITAL MULTIPLEX TRANSMISSION SYSTEM

BACKGROUND OF THE INVENTION

1. Field of the Invention

The invention relates to a method of synchronising the receiver arrangements in a digital multiplex transmission system.

2. Description of the Related Art

For the transmission of messages by a transmission means (for example lines, radio-channels) which is used in common by a plurality of subscribers, three basic methods are known, namely the code-division multiplex method, the frequency-division multiplex method and the time-division multiplex method.

In the code-division multiplex method the different messages conveyed through a common transmission means are, for example, modulated on a sub-carrier by basic modulation and the resultant signal, which in comparison with the channel bandwidth is a narrow-band signal, is spectrally distributed over the channel bandwidth by multiplex modulation with the aid of a code word characterising the receiver. The code-division multiplex channel (message transmission channel) thus obtained is not limited in time or bandwidth, but is limited relative to the power density. Reception of the signal is not effected by selection on a time or frequency basis but on the basis of the spectral coding. The plurality of spectrally encoded messages, superposed in the code-division multiplexed channel, are selected in the receiver on the basis of code words assigned thereto. For two-stage modulation (basic and multiplex modulation), phase shift keying (PSK) or frequency shift keying (FSK) are often utilized in radio transmission systems.

The first stage of the transmitter is supplied, for example, with a digitized speech signal (after having been converted in an analog-to-digital converter) and includes, for example, a multiplicative mixer. In the multiplicative mixer the supplied digitized speech signal is combined with a codeword assigned to this transmitter, which results in a spectral distribution. In a second modulation stage of the transmitter the wide-band signal (modulated, binary character sequence) is converted into a frequency band position suitable for transmission.

Recovering the message at the receiver is effected in the above-described code-division multiplex method by a sequence of basic demodulation and multiplex demodulation. Conversion to a frequency band position (for example baseband position) suitable for multiplex demodulation is effected in the basic demodulation stage by multiplying the signal by a reference sub-carrier. With the aid of a code word generator arranged in the receiver and also a code synchronising circuit the spectral distribution is cancelled, after the code word generator has been synchronised in the appropriate phase with the received code word. As a result thereof, the signal energy which has previously been spectrally distributed over the entire transmission band is compressed to the original frequency band, whilst the adjacent characters entering the receiver with a different multiplex modulation remain in the spectrally distributed state and can be suppressed by a bandpass filter having a bandwidth corresponding to the bandwidth of the non-distributed signal.

The system-determined residual interference in the multiplex demodulation, produced by the other signals, is lower according as the values of the cross-correlation functions between the different code words employed are lower and the distribution factor is larger. A non-zero value of the cross-correlation function reduces the signal-to-noise ratio. The signal-to-noise ratio and the synchronising period are determined by the cross-correlation and auto-correlation function.

In the frequency-division multiplex method the total bandwidth available for message transmission is subdivided into narrow frequency bands which each correspond to a message transmission channel. Such a narrow frequency band is available to the subscriber for the duration of the radio transmission.

In the time-division multiplex method each subscriber has at its disposal of the total bandwidth of a single radio channel which the subscriber may only utilize for short periods of time. The characters or character sequences of different subscribers are interleaved and are transmitted with correspondingly higher bit rates through the single radio channel, each time a channel assigned to a subscriber being repeated periodically with the frame period duration.

West German Pat. No. DE-OS 25 37 683 discloses a radio transmission system having stationary radio stations and mobile radio stations in which different channel accessing methods with asynchronous time-division multiplex, code-division multiplex and frequency-division multiplex are used.

For codeword synchronisation an incoherent subcarrier demodulation is used. A code generator generates sequentially each of nine different codes, which characterize the stationary ground-based radio stations. After this code has been synchronised with the received signal the IF-signal is multiplied, causing the wide spectrum in the message bandwidth to be transformed. Subsequent thereto the received message can, for example, be recovered using a DPSK demodulator. For the purpose of synchronisation the message code sample, having a length of, for example 15 bits, is used, which precedes the message.

Also combinations of the above-mentioned methods and their use in a digital radio transmission system are known. "Nachrichtentechnik, Elektronik+Telematik 38 (1984), Vol. 7, pages 264 to 268" describes for example a digital radio transmission system in which the time-division multiplex method is used in combination with code distribution. In the time channel for speech and/or data transmission (communication channel TCA) there are sequentially transmitted a bit sequence for determining the bit clock (synchronous), a frame synchronising word (leader) and the bit sequence of the message itself. The time division channels for message transmission (3×20 TCA) are combined with the control channels (3 CCH) to form a time-division multiplex frame having a duration of 31.5 msec. If a speech signal is to be transmitted as the message, adaptive delta modulation can be used for analog-to-digital conversion. The message characters (bits) then obtained have a code superposed on them in the transmitter. It has been found to be advantageous to combine individual message characters in blocks of four bits each and to distribute the block thus obtained by means of an orthogonal alphabet. The distribution factor used therewith is a compromise to combine the advantages of band distribution with the requirements as regards economical use of the frequencies. In addition, a message transmission method has been proposed (P 34 47 107.3) in which a different modulation method is utilized in the forward and return directions of the message transmission channels. For message transmission the mobile radio stations access one of a plurality of message channels. In the direction from the stationary radio station to the mobile radio stations assigned thereto, each message channel is distributed by means of code division modulation. The distributed message channels are superposed on each other and the wide-band sum signal thus obtained is transmitted in a common frequency band. In the direction from the mobile radio stations to the stationary radio station the message transmission is effected in separate, narrow-band frequency channels.

For the transmission of speech, in the direction from the stationary radio station to the mobile radio stations, the distribution modulation employed in the mobile radio station is selected by the stationary radio station and reported during the connection setp-up of the mobile radio station. For the transmission of signalling information to the mobile radio station assigned to the stationary radio station a distribution modulation is used which is common to all the mobile radio stations, in the direction from the stationary radio station to the mobile radio stations.

To distinguish between stationary radio stations in adjacent radio cells, these stations transmit, from the stationary radio stations to the mobile radio stations, in different frequency bands. The stationary radio stations include narrow-band receivers which during operation can be switched to a plurality of frequency channels. The number of transmission frequencies switchable in the mobile radio station is less than the number of receiver frequencies switchable in the stationary radio station. It is, for example, possible to effect in the stationary radio station a switch-over to 1,000 frequencies and a switch to 40 frequencies in the mobile radio station.

In each stationary radio station the receiver frequencies used there are managed on the basis of the interference situation. In the case of interferences in the reception, the relevant connection, from the mobile radio station to the stationary radio station, is switched to a different, non-disturbed frequency channel, to which both the stationary radio station and the mobile radio station can switch. The receiver arrangement in the stationary radio station towards the wire network of the public telephone system continues to participate in the connection.

Synchronising the receiver arrangement is very important when block-wise transmission of messages is used, as in the case of incorrect synchronisation the entire block and the message contained therein are mutilated. More specifically, in a radio transmission system in which the connection is effected our propagation paths which are subject to obstruction and in which reflection frequently occurs, errors often occur in the received signal and result in disturbances in the connection. The connection disturbances whose duration and frequency depend on the transmission rate and correspond to a Rayleight distribution, are based on a transmission path-dependent field strength distribution, which in dependence on the reflection coefficients of the environment result in error rates of well over 1%, often substantially 50%.

SUMMARY OF THE INVENTION

The invention has for its object to provide a message transmission method in which the synchronisation of the receiver arrangements can be effected free from disturbances.

In the method according to the invention, the same synchronising symbols are gated into the code levels (code-division multiplex transmission system) or frequency levels (frequency-division multiplex transmission system). This may accomplish that the synchronisation symbols transmitted by the central transmission station (stationary radio station) do not disturb each other. The synchronising symbols which are simultaneously transmitted in all the message transmission channels are received in all the receiver arrangements with a significantly higher energy compared with the useful information. When the method according to the invention is used in a digital radio transmission system, adjacent stationary radio stations can be distinguished by different frequencies or different code words. The synchronising symbols can be received substantially interference-free and be utilized in the receiver arrangement for a fail-safe survey of the multipath profile. By gating the synchronising symbols into the continuous data stream of the useful information, spaced, for example, by one ms, multi-path reception is possible even at high vehicle speeds. The method according to the invention can then also be used in different transmission methods (for example 2-PSK) or different multiplex methods (for example CDM: Code Division Multiplex).

The method has the advantage that because of the phase-locked (not necessarily equal phase) addition of the synchronising symbols a (non-controlled) opposite triggering of identical synchronising symbols in the individual message transmission channels is prevented.

For distributing the synchronising symbols and the data symbols it is possible to use the same distribution codes in the code levels. If different code sets are used, an erroneous synchronisation in the receiver arrangement can be excluded with certainty. The same holds when a code-division multiplex method is used for the data symbols and different frequencies for the synchronising symbols.

If, the data and synchronising symbols of the different message transmission channels are transmitted in code-division multiplex, the noise-immunity of the synchronisation can be improved to a still greater extent, as the mutual interferences of different message transmission channels which are typical for the code-division multiplex method are not present in the synchronising symbols.

If, the receiver arrangement is matched to the channel properties on the basis of the supervised multi-path profile, then the accuracy of a good transmission can be further increased. The matching operation can be effected by tracking the sampling instants or by adaptive equalization.

The method has the advantage that synchronisation in the receiver arrangement, more specifically the circuit cost and design effort required therefor, can be reduced in a simple way and manner.

In one embodiment of the method the block length is a multiple of the distance between the synchronising symbols, enabling the synchronising method in the receiver to be simplified. The aim must then be a compromise between the receiver cost and circuit cost in the control arrangement for effecting the synchronisation.

In the method as claimed in patent claim 8 a lower receiver cost and design effort is indeed required but on the other hand a more complicated synchronisation method is necessary.

In one embodiment of a circuit arrangement for performing the method little additional circuit cost and design effort are required, as a number of arrangements already present in the stationary and mobile radio stations can be utilized.

BRIEF DESCRIPTION OF THE DRAWINGS

The method according to the invention will now be described in greater detail with reference to the embodiments shown in the accompanying drawings. Therein:

FIG. 1 illustrates the case in which the method is used in a code-division multiplex transmission system, a first embodiment of the synchronising method according to the invention, FIG. 2 illustrates the code sets used for the method shown in FIG. 1.

DESCRIPTION OF THE PREFERRED EMBODIMENTS

FIG. 1 illustrates a code-division multiplex transmission system in which the individual transmission channels are separated from each other by using different sets of code symbols. Because of the predetermined, selected code symbols for the distribution, such as, for example, pseudo-random orthogonal or quasi-orthogonal codewords, the simultaneous transmission of messages in code-division multiplex is possible. In the embodiment shown in FIG. 1, eight individual distribution codes are used which evidence a distribution of 31, that is to say a length of 31. A distribution of 31 is only possible when used in a digital radio transmission system because all the code-division multiplex channels of the transmitter in the stationary radio station are transmitted with equal powers and time-synchronously. By using four symbols in each code division multiplex channel, two bits of the useful signal can be combined in one symbol. As a result thereof the symbol rate is reduced by half relative to the baseband bit rate.

In the method according to the invention synchronising symbols s are inserted between the data symbols with defined spacings, these symbols being transmitted in all the message transmission channels in time-parallel and in synchronism, from the stationary radio station (BS). For the synchronisation two symbols $c_0$, $\bar{c}_0$ are required which are the same for all the code-division multiplex channels. Two of these symbols can be represented by an anti-podal distribution codeword and the relevant receiver arrangement must be capable of recognising three different anti-podal code words. Six different symbols are available for encoding the baseband signals and the synchronising symbols, two of which are exclusively used for synchronisation. As the message transmission is effected simultaneously in eight code-division multiplex channels, different code words must be used in the transmitter 17 whilst for accessing the message transmission channel only three different code words are necessary in the receiver arrangement.

Figure 3:
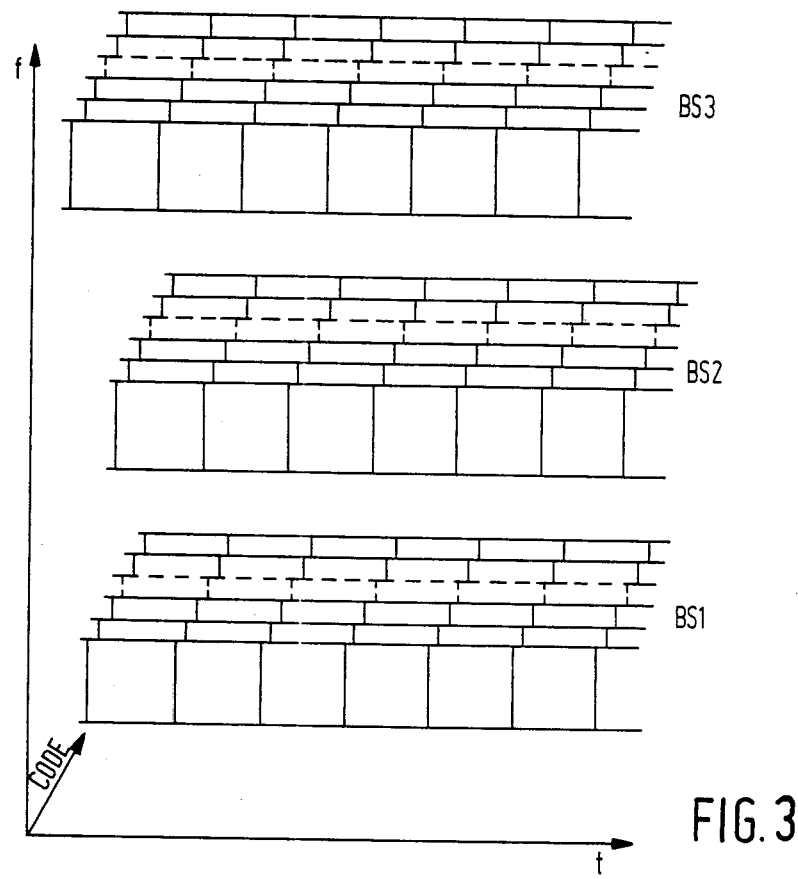
FIG. 3 illustrates the case in which the method is used in a combined code-division multiplex/frequency-division multiplex transmission system, a second embodiment of the synchronising method according to the invention.

If in the digital multiplex transmission system three different code sets are used, then each receiver arrangement must be capable of setting its correlator to 51 different code words, for which a maximum of three correlators are required. The synchronising symbol s is independent of the modulation of the signal and encoding of the message transmission channel, so that a synchronisation in the receiver direction is possible, without decoding and demodulating the actual message. In the method according to the invention no synchronisation of the transmitter is required in the multiplex transmission system (as shown in FIG. 3 between different sub-carrier frequencies of adjacent stationary radio stations BS1 to BS3). Only the message transmission channels separated by the code division multiplex method within a sub-carrier are synchronized. The synchronising symbols s which are transmitted simultaneously through the eight parallel code-division multiplex channels are received in all the receiver arrangements with a significantly higher energy than the data symbols. If the voltage phases are correctly added together in the transmitter each individual receiver arrangement receives the synchronising information approximately 18 dB above the normal level. In addition, the common-channel interferences caused by the code-division multiplex-operated transmission channels of the same carrier disappear. As a result thereof a fail-safe synchronisation can be effected.

The receiver arrangement first synchronises itself with the frequency of the non-coherently received synchronising symbols s, the polarity of the synchronising symbols s ($c_0$, $\bar{c}_0$) not being taken into account. As shown in FIG. 1 or FIG. 3 the synchronising symbols s are transmitted at defined time distances, for example every millisecond, so that the synchronisation procedure of the bit synchronisation ends relatively quickly.

In the second step, the coherent demodulation and consequently the recognition with the correct sign of the received symbols is rendered possible. Each synchronising symbol s produces at the correlator output a positive or a negative pulse, corresponding to the logic state "1" or "0", respectively. The synchronising symbols s are encoded with positive or negative signs, respectively, such that any sign reversal by a phase shifted through 180° can be detected therefrom, so that the synchronising method according to the invention can also be utilized for frame synchronisation in a combined code division multiplex-time division multiplex transmission system (see FIGS. 4 and 5).

In the method according to the invention the synchronising symbol s can also be used for measuring the multi-path profile. To ensure that measuring the multi-path profile is as error-free as possible, the synchronising symbol s is transmitted at adequately short distances, for example every millisecond. Because of the significantly higher power compared with the data symbols the synchronising symbol s is received in the receiver arrangements sufficiently interference-free. As a result thereof, multi-paths can be cancelled with a sufficient degree of accuracy and fading effects can be avoided to a very large extent.

The synchronising method according to the invention is also suitable for use in a combined code-division multiplex/frequency-division multiplex transmission system. For the case in which the method is used in a digital radio transmission system, the stationary radio stations BS1 to BS3 are separated from each other by the use of different RF-carriers with different frequencies f. Each stationary radio station BS to BS3 supplies a cell group (cluster) formed by C-cells. Investigations have proved that for the transmission direction from the stationary radio station to the receiver arrangements a 3-cell cluster is sufficient for suppressing common-channel frequencies.

So as to render it possible to increase the transmission capacity in a digital radio transmission system still further additional message transmission channels are created in each code level using the time-division multiplex method. If eight individual distribution code levels with four time-staggered channels are formed, then 32 individual channels up to 16 kbit/s each can be transmitted, which after code distribution are modulated on a common RF-carrier. When 4-phase modulation is used, a bandwidth of 1.25 MHz is obtained for the 32 individual channels. The non-coincidence in time and consequently the number of message transmission channels per distribution code level depend on the bit rate required for each message transmission channel. Because of the fact that each time two bits are combined to form one of four possible symbols, the symbol duration, which is 25 $\mu$s, is adequately long to avoid intersymbol interferences produced by multi-path reception and on the other hand the cost in the receiver arrangements for the correlators is low. The 16 distribution codes used within a stationary radio station BS for separating the code levels must be pairwise orthogonal for the case of an identical position in time, whilst in different stationary radio stations BS having equal carriers the different synchronising symbols s must have the lowest possible cross-correlation products at any time shifts.

Distribution codes satisfying these conditions are what are commonly referred to as Gold codes. A change in the distribution code does not affect the receiver arrangements since these arrangements have programmable correlators which are always reset from connection to connection on the basis of indications supplied by the stationary radio station BS. For the transmission of such setting data and for separating the individual time channels in the time-division multiplex frame ZR, a control channel ACCH is provided in the time-division multiplex frame ZR.

Figure 4:
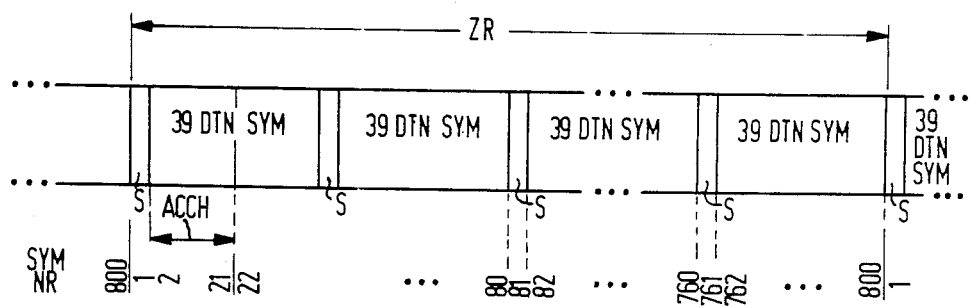
FIG. 4 illustrates for application in a code-division multiplex/time-division multiplex transmission system, a third embodiment of the synchronising method according to the invention.
Figure 5:
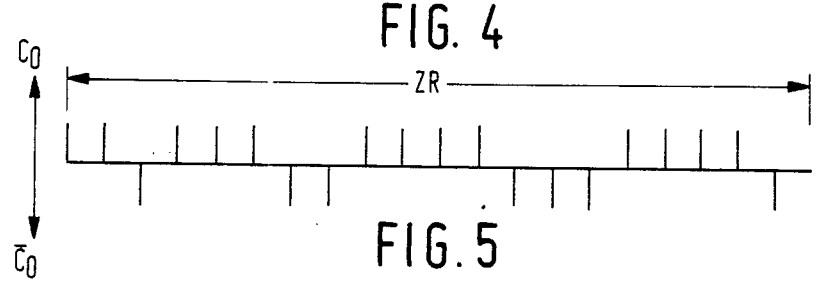
FIG. 5 shows the different code sets used in the method illustrated in FIG. 4.

As will be obvious from FIGS. 4 and 5, the synchronising symbols s in the time-division multiplex frame ZR are inserted with defined spacings between the data symbols and encoded with positive or negative signs such that therefrom any sign reversal by a phase shifted through 180° can be recognised and it may be decided that a frame starts. The receiver arrangement now only resets a bit counter and as a result thereof also the frame synchronisation is ensured. For a framelength of 20 milliseconds for the time-division multiplex frame the time for the overall synchronisation procedure is of the order of 100 ms. The 25 $\mu$s symbol period of the distribution code word has been chosen so large that symbol interferences can be avoided to a very large extent or occur only with small amplitudes. The chip duration is obtained at a distribution of 31 to 0.806 ns and the chip rate to 1.24 Mcps. Consequently, also the chip duration is small enough to allow an adequate cancellation of the multi-paths and to avoid fading influences to the highest possible extent. Each code level allows a maximum gross bit rate of 76 kbit/s including 2 kbit/s for a control channel ACCH assigned to each codeword and including 2 kbit/s for the transmission of synchronising information.

Figure 6:
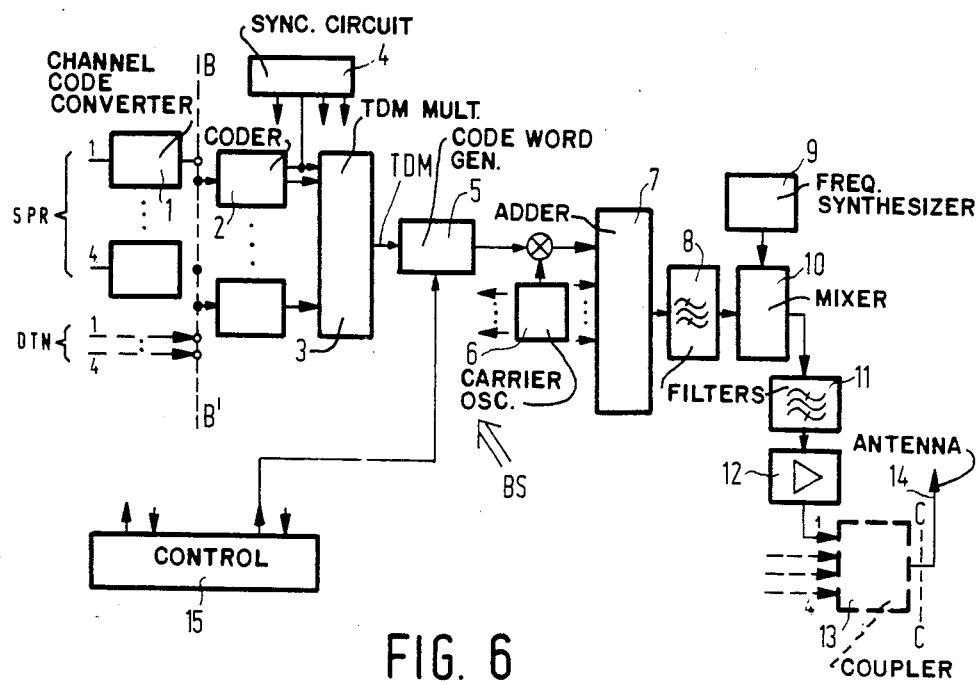
FIG. 6 is a block circuit diagram of an embodiment of the transmitter portion of a stationary radio station and FIG. 7 is a block circuit diagram of an embodiment for the receive portion of the mobile radio station for performing the method according to the invention.

FIG. 6 is a block circuit diagram of the transmitting portion of the stationary radio station BS. The data/voice stream transmitted in the baseband is assembled as follows. The digitized speech of each individual channel is first converted in a code converter 1 from PCM to the transmission method with correspondingly lower bit rate, required for the radio transmission. A data source can be connected in the interface B-B. In a channel code arrangement 2 connected to the data source and, converter, respectively, a special channel coding is added to protect significant bits from transmission errors in the transmission channel. Depending on the service transmitting the information the channel coding can be different. In a multiplexer 3 connected to the channel coding arrangement 2 the signalling information accompanying the connection and the synchronisation information originating from the synchronising circuit 4 are inserted in the data stream. Consequently, the TDM-signal (Time-Division-Multiplex-signal) at the output of the TDM-multiplexer 3 comprises for the method shown in FIG. 4 four voice/data channels, a signalling channel (for a TDM channel bundle) and also the synchronising bits required for the synchronisation in the mobile radio station MS. The synchronising signals are gated into the TDM signal.

The TDM signal at the output of the multiplexer 3 is multiplied by each codeword produced by the code generator 5, always two bits being combined into one symbol and being distributed with the desired code. The code generator 5 is connected to and controlled by the control arrangement 15, and inserts synchronising symbols instead of data symbols into the continuous data stream occurring at the output of the mjultiplexer 3. A modulation method adapted to the properties of the radio transmission channel is applied to the distributed signal, for example the phase of a carrier signal originating from an oscillator 6 is then keyed by the distributed signal, a BPSK (Binary Phase Shift Keying) signal which is modulated at a low intermediate frequency and is combined with the information and the codeword being produced. The modulated CDM-signal is applied to an adder 7 whose output is connected to a bandpass filter 8. After having been added together and passband filtering, eight of these modulated CDM signals form an overall signal with multi-stage amplitude which finally is converted to the output frequency.

To that end a synthesizer 9 is provided such as a mixer oscillater which, within the frequency range of the digital radio transmission system, can be switched to particular frequencies. The synthesizer 9 is only designed for the few, possible frequencies of the TDM-stage (Frequency-Division Multiplex stage). Mixing the CDM signal with the corresponding frequency produced by the synthesizer 9 is effected in an arrangement 10 connected to a band-pass filter 11. The output of the bandpass filter 11 is connected to a power amplifier 12, and the filtered-out and amplified transmission signal is applied to the antenna 14 via a transmitter coupler 13. The transmitter coupler 13 is completely omitted in the case of small stationary radio stations BS having up to 32 message transmission channels.

The channel and code generator setting, the appropriate selection of the channel code and inserting reports in the control data stream is effected by means of the control arrangement 15 provided in the stationary radio station BS. The selected radio transmission channel may then be a TDM channel in a CDM plane.

Figure 7:
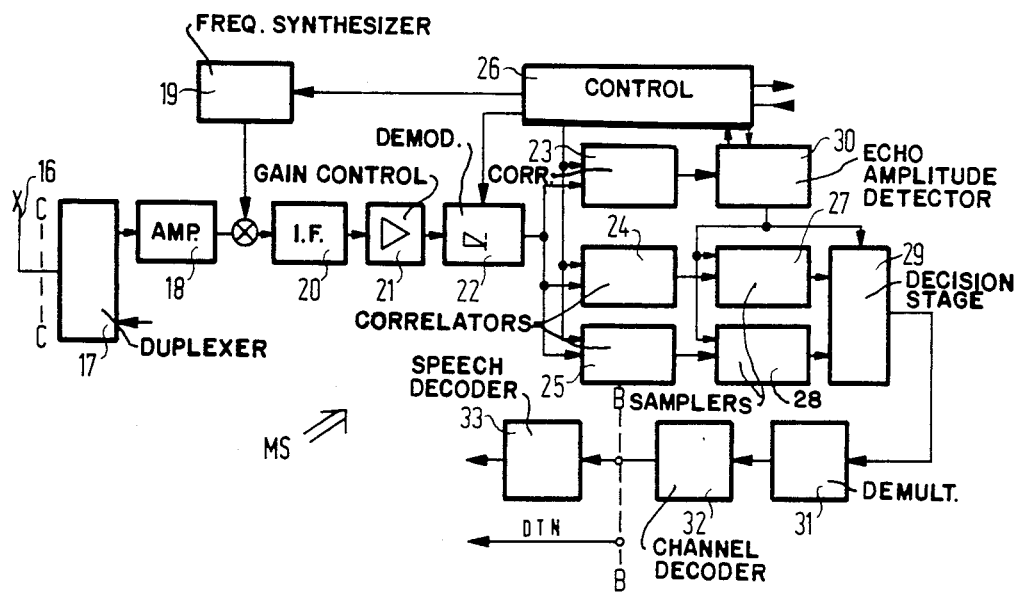

FIG. 7 is a block circuit diagram of the receiver portion of the mobile radio station MS. The signal received from a common transmit/receive antenna 16 is applied to the input stage 18 of the receiver via a receive filter of a duplexer 17. The requirements to be satisfied by the receive filter of the duplexer 17 are comparatively low, so that also for mobile radio stations MS with a low service requirement, for example, a simple data radio set, a low-cost solution is possible. The signal is amplified in the input stage 18 and is then mixed with a syntesizer frequency received from the synthesizer 19 to produce an intermediate frequency signal.

The intermediate frequency signal is applied to an IF-stage 20, in which the signal is further amplified and filtered. A simple low-cost synthesizer can also be used as was also the case for synthesizer 9, as the synthesizer 19 for the stationary radio station. The IF-portion 20 includes filters which have for their object the adjacent-channel selection for shielding from adjacent broadband channels and suppressing mixed products, respectively. The actual noise filtering action is effected in the correlators 23 to 25. A gain control circuit 21 which raises the output signal of the IF-portion 20 to an appropriate level for driving the subsequent circuits and prevents the risk of these circuits from being overdriven, is connected to the IF-portion 20. The gain control circuit 21 equalizes different radio field attenuations and level fluctuations due to shadowing, so that in the subsequent arrangements of the mobile radio station MS a linear processing operation can be performed. The control time constant of the gain control circuit 21 is basically determined by the shadow effects.

The power-controlled IF-signal at the output of the gain control circuit 21 is converted in the baseband in a demodulator 22 connected to the amplitude control circuit. This can, for example, be effected by using a BPSK modulation of the Costas loop principle, so that also the frequency and the phase are taken into account. Ambiguities and integral multiples of 180° can be recognized and compensated for on the basis of the polarity of the synchronising word received.

Three correlators 23, 24 and 25, which are adjusted by a control arrangement 26 to the codes 1 and 2 then valid and to a synchronising code valid in the radio zone for the overall channel bundle, are connected to the demodulator 22. By means of the control arrangement 26 the received control data stream is evaluated in that the data of the service desired by the subscriber and the data for the device-specific radio transmission channels are read, a radio transmission channel which in the control data stream is indicated as being free and which is switchable in the mobile radio station MS is selected, and subsequently an access signal is transmitted to the stationary radio station BS.

The output signals of the correlators 23 to 25 are used for deriving the symbol clock, the frame clock and the bit clock, and also used to measure the instantaneously valid multi-path profile. As a uniform synchronising code with correspondingly higher level is radiated into the overall channel bundle at the same instant, an unambiguous synchronisation detection and multi-path profile measurement is obtained.

The outputs of the correlators 24 and 25 are connected to sampling circuits 27, 28 which sample the output signals of the correlators 24 and 25 and apply each sampling result to a decision stage 29. The results of the sampling operations which are performed synchronously with the echos of the multi-path propagation are weighted in the decision stage 29 proportionally to the echo amplitude using an arrangement 30. The decision stage 29 serves to estimate the transmitted code and the polarity of the code value. The estimated value consequently allows the selection of the symbols which are most probably transmitted. After the symbol-to-bit convertion in the decision stage 29 the output signal is transmitted to a TDM demultiplexer 31 connected to the decision stage 29. The demultiplexer 31 is connected to a channel decoder 32 at whose output the transmitted data stream is available again. In digital speech transmission the digital speech signal is decoded in a speech decoder 33 and applied to a D/A converter and a loudspeaker connected thereto.

If, for example, the data service type of service is provided in the mobile radio station MS, then the data produced at the output of the channel decoder 32 can directly, for example, be shown or expressed.

What is claimed is:

1. In a digital multiplex transmission system comprising a base radio station having a transmitter and a plurality of mobile radio stations each having a receiver, channels for transmission of data symbols ($d_1 \ldots d_n$) from the transmitter to the respective receivers being established by employing different code distributions of such data symbols in respective channels, such data symbols being transmitted in time-synchronism with each other; a method of synchronizing the base station transmitter with the mobile station receivers, comprising:

insertion of respective synchronizing symbols ($S_1 \ldots S_n$) between successive data symbols transmitted in each of said channels, the synchronizing symbols in all channels being identical and the synchronizing symbols in each channel all being spaced at the same time intervals; and simultaneously transmitting the speech symbols in a plurality of said channels.

2. A method as claimed in claim 1, characterized in that the data symbols of the individual message transmission channels are transmitted with a defined mutual carrier phase.

3. A method as claimed in claim 1, characterized in that synchronising symbols ($s_1 \ldots s_n$) are used which differ from all the data symbols ($d_1 \ldots d_m$).

4. A method as claimed in claim 1, characterized in that data and synchronising symbols ($d_1 \ldots d, s_1 \ldots s_n$) of the different message transmission channels are transmitted in accordance with a code-division multiplex method.

5. A method as claimed in claim 1, characterized in that each receiver determines on the basis of the received synchronising symbols ($s_1 \ldots s_n$) the instantaneous transmission factors of the message transmission channel and the receiver adapts its properties continuously to such transmission factors.

6. A method as claimed in claim 1, characterized in that the synchronising symbols ($s_1 \ldots s_n$) are transmitted at regular time intervals which are known to the receiver.

7. A method as claimed in claim 1, characterized in that the data symbols are transmitted block-sequentially, the synchronizing symbols are transmitted as either of at least two different symbols ($c_0$, $\bar{c}_0$), the sequence and time positions of the symbols ($c_0$, $\bar{c}_0$) being known to the receiver, and that from the instants of reception of received blocks of data symbols and the sequence of the received symbols ($c_0$, $\bar{c}_0$) the receiver determines the time position of the beginning of each block of data symbols.

8. A method as claimed in claim 1, characterized in that the data symbols are transmitted block-sequentially, the synchronizing symbols are transmitted at time intervals in relation to the transmitted data blocks which are known to the receiver, and from the time positions of the received synchronizing symbols the receiver determines the time position of the beginning of each block of data symbols.

9. In a digital radio transmission system in which a plurality of message transmission channels are established between a stationary radio station transmitter and a plurality of mobile radio station receivers by a combination of time-division multiplex, code-division multiplex and frequency-division multiplex transmission; a circuit arrangement for performing a method as claimed in claim 1, such arrangement being characterized in that:

the stationary radio station transmitter comprises a control arrangement (15) and a synchronizing circuit (4) connected thereto, such control arrangement inserting successive synchronizing symbols ($s_1 \ldots s_n$) produced by the synchronizing circuit (4) between successive data symbols ($d_1 \ldots d_n$) transmitted in each channel, the synchronizing symbols in each channels being spaced at the same time intervals; and a code generator (5) connected to and controlled by the control arrangement (15), such code generator selecting the synchronizing symbols from a store of such symbols contained therein; and each of the mobile radio station receivers comprises a plurality of sampling circuits for sampling received data symbols;

a control arrangement (26) for synchronizing said sampling circuits with received synchronizing symbols; and an echo signal amplitude detector connected to said sampling circuits for weighting the sampled received data symbols in proportion to the amplitudes of received echoes of the data symbols.

* * * * *